INVENTOR.
MAHLON E. SETTEM

INVENTOR.
MAHLON E. SETTEM
BY Mathis and Graybeal
ATTORNEYS

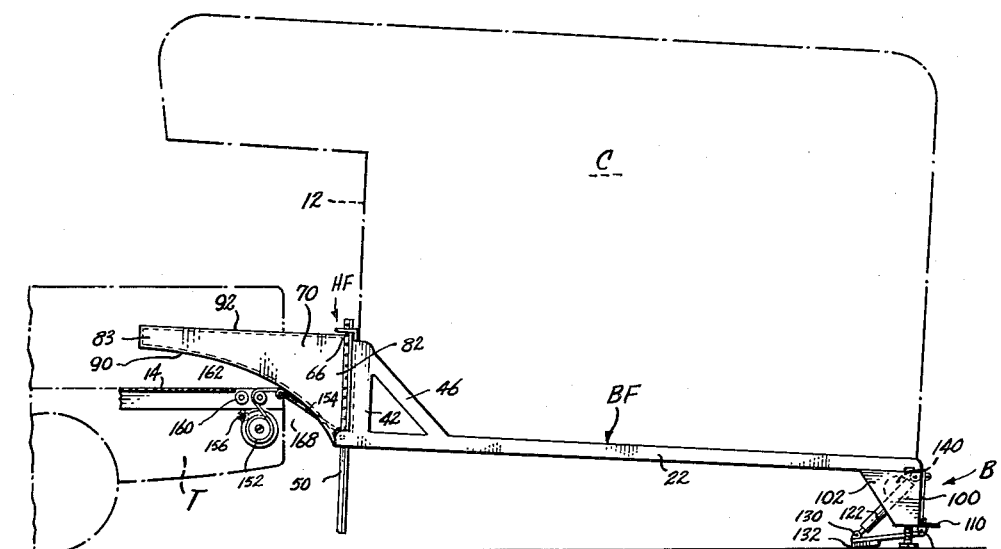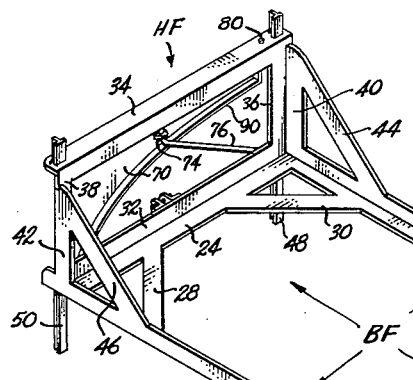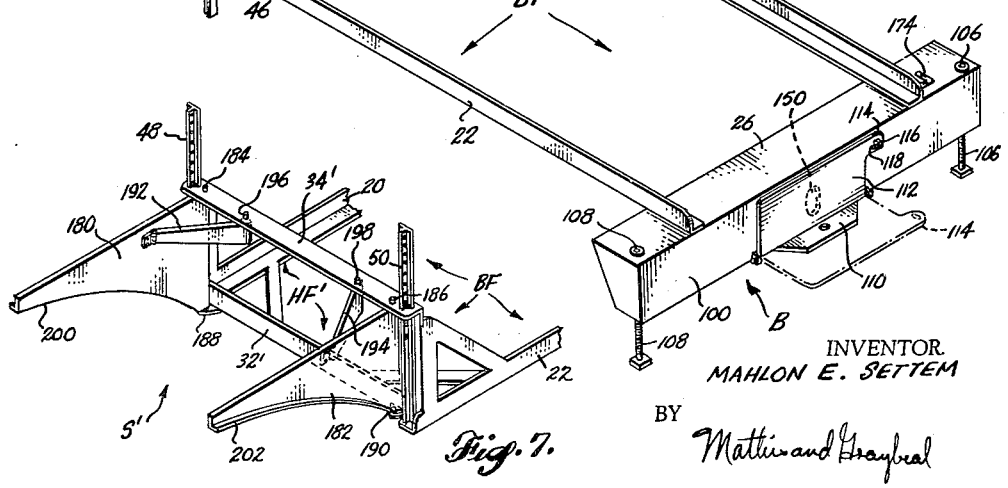

United States Patent Office 3,197,054
Patented July 27, 1965

3,197,054
TRANSFER MECHANISM FOR CAMPERS AND
LIKE FRAMED UNITS
Mahlon E. Settem, P.O. Box 16, Issaquah, Wash.
Filed Sept. 28, 1962, Ser. No. 226,991
23 Claims. (Cl. 214—517)

The present invention relates to accessory handling mechanism for framed units such as so-called "campers" or like structures which are carried by and disengageable as a unit from a transport vehicle. More particularly this invention relates to mechanism facilitating on-loading and off-loading transfer of a camper or the like in relation to the open bed of the transport vehicle and for adjustably and stably ground supporting the camper type unit when off the vehicle.

Since the functions and structural arrangements contemplated by the invention are essentially the same for any unitary framed structure, carried on the bed of a vehicle, regardless of the purpose of the structural unit, the invention is specifically discussed herein simply with reference to its use in conjunction with campers.

Thus, by way of example, the problem of loading a camper onto and off of the bed of a pickup has involved either manipulation of the camper by lifting or hoisting same (as in Hocks et al. U.S. Patent No. 2,984,515) or by manipulation of jacks or stilts (as in Eams U.S. Patent No. 2,995,397 and Ervine U.S. Patent No. 2,893,780).

As will be apparent, in the instances where a camper is manipulated by a lifting or hoisting technique, the operation is quite cumbersome and either requires special equipment or the presence of a considerable amount of manpower. Also, if a camper is simply placed on the ground when unloaded, it is often difficult to stabilize and level it. In the case where jacks or stilts are used to raise the camper off the pickup bed and support the camper above ground when off the pickup, it is customary for practical convenience to leave the camper base at pickup bed height, resulting in a rather ungainly appearance and less than desirable stability, in view of the high center of gravity of the camper.

Objects, features and advantages of the framed unit transfer mechanism according to the invention includes the following:

(a) A unit transfer assembly which is winchable on and off the bed of a supporting vehicle by self-contained winch and haul line means;

(b) A unit transfer assembly where the base of the unloaded unit can be conveniently placed at any selected above-ground level below the bed level of the vehicle;

(c) A unit transfer assembly including forwardly directable and retractible skid means, providing one or more sloped and preferably curved skid surfaces by which the transition of the forward part of the base of the unit onto and off of the vehicle bed is accomplished without abrupt drop of the unit, and whereby the forward end of the unit is supported at any desired level during an unloading operation so that forward support legs can be set to desired height before the unit is fully ground supported;

(d) A transfer assembly for a framed unit, having forwardly directable skid means which are mounted so as to be foldable inboardly of the assembly once the forward portion of the base of the unit is resting on the vehicle bed, the folded disposition of such skid means permitting the forward wall of the unit to nest substantially against the vehicle cab in like manner as if the support assembly were not present;

(e) A unit transfer assembly involving foldable, forwardly directable skid means which carry much of the load of the unit while the forward end of the unit is being lifted and moved onto the bed of the supporting vehicle, with a portion of the lifting and guiding action also being accomplished by a winched line;

(f) A transfer assembly for a framed unit, wherein during an unloading operation the rear end of the unit is equipped with adjustable landing supports and means for cushioning the fall thereof; and (g) A unit transfer structure for loading and unloading a framed unit from the bed of a supporting vehicle, wherein the operation of loading or unloading can be readily accomplished by one person.

These and other objects, features and advantages of accessory structures characteristic of the invention will be apparent from the following specific description of certain typical and therefor non-limitive embodiments thereof, taken together with the accompanying illustrations, wherein like letters and numerals refer to like parts, and wherein:

FIG. 5 is a further side elevational view of the camper, truck, and camper transfer assembly shown in FIGS. 1–4, with the camper and its transfer assembly off the truck bed except for the support of the front end thereof on the truck bed through the medium of the forwardly extended skid means;

FIG. 6 is an isometric view of the camper transfer assembly shown at FIGS. 1–5, showing further detail thereof; and FIG. 7 is a view of a modified form of camper transfer assembly according to the present invention, wherein two forwardly extendible and pivotally foldable skid means are employed.

Figure 1:
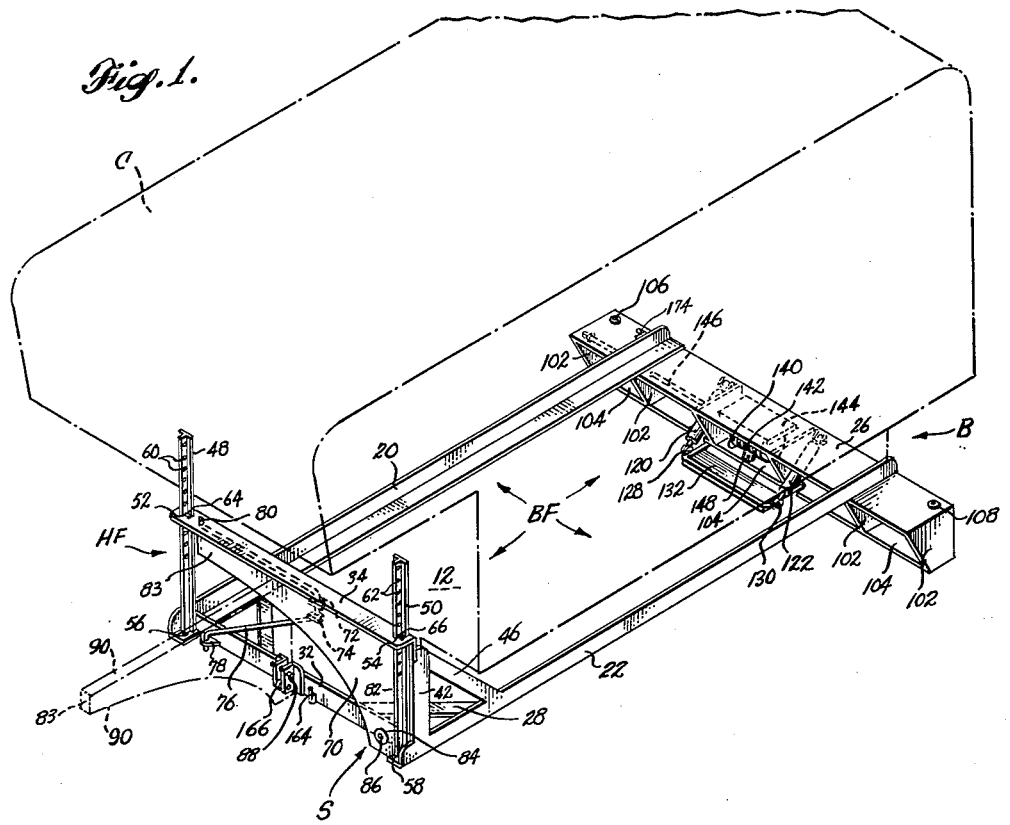
FIG. 1 is an isometric view of a unit transfer assembly according to the invention, with an associated camper shown in phantom in conjunction therewith, and with the said assembly comprising a single, foldably mounted, forwardly directable skid means.

Referring more specifically to the camper transfer mechanism shown at FIGS. 1–6, it will be understood that camper C is of a type conventional per se (a so-called "over-cab" style camper being selected simply by way of example), having a base or bottom 10 (FIG. 4) and a forward wall 12. In the common manner of usage, as will be readily understood, the base 10 of camper C rests on and is carried by the bed 14 of a supporting vehicle such as pickup truck T, with the forward wall 12 of camper C nested just behind the cab 16 of pickup T.

According to the present invention, a camper transfer mechanism is attached to and supports the base 10 of camper C and is in turn supported by and removable from the bed 14 of pickup T. The transfer mechanism is thus an integrated accessory with respect to the camper C, functioning to aid in the loading and unloading thereof from the pickup T and to aid in the efficient placement of the camper C in ground supported position when offloaded from the pickup T.

More specifically, the transfer mechanism characteristic of the invention, as shown at FIGS. 1–6, comprises a bed frame (generally indicated at BF), a head frame (generally indicated at HF), a bumper means (generally indicated at B) and skid means (generally indicated at S) mounted on the head frame HF so as to be selectively retractable and extendible forwardly of said head frame HF.

In the particular structural arrangement illustrated, the bed frame BF is constituted by a laterally spaced pair of angle-irons 20, 22, joined at their forward ends by a lateral panel 24 and joined at their rear ends by the central portion of horizontal panel 26 of the bumper means B. The longitudinal rails presented by angle irons 20, 22 are suitable cross braced to the lateral panel 24, as by brace bars 28, 30, and the bed frame BF is suitably attached to the base 10 of camper C, as by bolts or screws (not shown).

Head frame HF stands uprightly at the forward end of bed frame BF and comprises, in the specific construction shown, a laterally extending lower panel 32, a laterally extending angle iron 34 along the upper side, and uprightly extending end irons 36, 38, which are in turn rigidly connected to the angle irons 20, 22 of the bed frame by means of respective vertical braces 40, 42 and cross braces 44, 46.

Forward leg means 48, 50 are suitably of T-angle configuration and are respectively vertically adjustable by longitudinal movement in T-slots 52, 54 and 56, 58, the upper T-slots 52, 56 being situated at the ends of the upper iron 34 of the head frame HF, and the lower T-slots 54, 58 being situated in the forward extremities of bed frame rails 20, 22. Said legs 48, 50 are vertically adjustable and lockable in any desired position by means of the series of adjustment holes 60, 62 in the respective legs 48, 50, into which respective lock pins 64, 66 are placeable to lock the legs at any desired position. As will be obvious, when the legs 48, 50 are retracted and simply stowed, as when the camper is in loaded position on the pickup T, the respective pins 64, 66 are placed to rest on the upper face of the head frame iron 34 (as shown in FIG. 1), and when the legs 48, 50 are extended and to be weight supporting, the lock pins 64, 66 are placed to engage the lower surface of said head frame iron 34.

Skid means S is pivotally mounted forwardly of head frame HF so as to move from either an extended, forwardly directed position (cf. FIG. 5), or a retracted, nested position (cf. FIGS. 1 and 6) with respect to the said head frame HF. In the particular embodiment shown, the skid plate 70 carries about centrally thereof a pair of trunnions 72, 74 through which brace bar 76 passes, the lower end of said brace bar 76 being journaled in a lug 78 at the side of lower head frame cross bar 32, and the upper end of said brace bar 76 being journaled in a hole 80 in the head frame upper iron 34. By this arrangement, with the brace bar 76 offset in the manner shown, when the brace bar 76 folds against the head frame HF the skid plate 70 is likewise folded against the head frame with the rear edge 82 of the plate 70 at one side of the head frame and with the tip 83 of the plate 70 at the other side of said head frame. And, when the brace bar 76 is pivoted outwardly from the head frame HF, the skid plate 70 is movable into forwardly extended position with the rear edge 82 thereof butted against the upper iron 34 of the head frame HF in its upper portion, and against the lower iron 32 of the head frame HF in its lower portion. For structural rigidity, the said lower portion of the rear edge 82 of the skid plate 70 is removably attachable to the lower head frame iron 32 by means of an eye pad 84 on said lower iron 32 and by a hole 86 in the lower, rearward portion of skid plate 70, the said hole 86 being keyed to the eye pad 84 by a removable lock pin 88.

Skid plate 70 comprises respective cross plates 90 and 92 along the lower and upper edges thereof for adequate strength and also, in the case of lower edge 90, to provide a skid surface of adequate lateral dimension. As shown, the skid surface 90 of the skid plate 70 slopes upwardly and forwardly beginning in its rear portion at about the level of the bed frame BF, and extending to a relatively narrow vertical dimension in the forward tip 83 thereof. Preferably also, though not necessarily, the skid surface 90 of the skid plate 70 is of concaved configuration to provide relatively greater lift just before the bed frame BF reaches the level of the bed 14 of the pickup T during the loading operation, and to provide a relatively lesser change in height in the last stage of support of the forward end of the camper by the pickup bed 14 during the unloading phase.

The rear part of the camper transfer assembly shown at FIGS. 1–6 comprises a bumper means B, which is also termable a tail frame. As shown, said bumper means B is a box-like structure extending laterally at the rear of the transfer assembly, and the horizontal panel 26 thereof functions as a part of the bed frame BF, as earlier indicated. In addition, said bumper means B comprises a vertically and downwardly extending panel 100 which serves as a bumper surface and also provides structural rigidity in conjunction with a series of upright bracing panels 102 and a bottom panel 104.

The laterally extending bumper means B is preferably of a length to be substantially as wide as the camper C, and mounts near the ends thereof rear leg means 106, 108, which are suitably in the form of telescoping screw jacks, as shown.

As accessory features, the vertical panel 100 of the bumper means B has standing out rearwardly from the lower edge thereof a trailer hitch mounting plate 110, as well as a step means 112 hinged along substantially the lower edge of said vertical panel 100 so as to be movable from a substantially vertical position nested against panel 100 (as shown in solid line at FIG. 6) to a substantially horizontal position (as shown in broken line at FIG. 6) for use as a step in entering and leaving the camper C. Said trailer hitch mounting plate 110 also serves to provide support for the step 112 when the latter is horizontal. To positively retain the step 112 in vertical position when desired, an eye 114 at one side thereof can be anchored to a lug 116 standing rearwardly of the vertical panel 110, as by lock pin 118.

To cushion the fall of the rear portion of the camper and transfer assembly during the unloading operation, a shock absorber assembly is provided in the central portion of bumper means B. Such shock absorber assembly suitably comprises a laterally spaced pair of double-acting hydraulic cylinders 120, 122 (such as are conventional per se and used as automotive shock absorbers), pivotally anchored to respective eye pads 124, 126 on the front side of vertical panel 100, with the respective piston rods 128, 130 pivotally connected to a foot plate 132, which is in turn also pivotally mounted to the under side of the bumper means B, as by being pinned to eye pads 134. As will be apparent, the foot plate 132 is either retractible or extendible manually, and when extended provides a cushioning action upon impact with the ground (note FIG. 4).

To permit the transfer assembly to be winched on and off the bed of the supporting vehicle, a winch unit can be installed either in the bumper means B or on the pickup T at the rear and just below the bed thereof. For simplicity of illustration, the embodiment of the invention illustrated at FIGS. 1–6 includes a winch mechanism in the camper transfer assembly, and also a second winch mechanism installed in the pickup T. However, it is to be understood that particular installations will in many cases involve but a single winch, either in the transfer assembly or on the supporting vehicle, as desired. The alternative operations with respect to these winching mechanisms are discussed in more detail below.

In general, it is considered that for usage where a given camper may be used successively with several supporting vehicles, such as for a rental camper, it is preferable to have the winch mechanism installed in the transfer assembly. On the other hand, when a camper is to be successively loaded and unloaded from a given supporting vehicle, such as when the camper is owned by the owner of the supporting vehicle and the vehicle is also used for other purposes, it can oftentimes be desirable to have the winch mechanism installed directly on the supporting vehicle, in which case the winch mechanism on the transfer assembly can be dispensed with.

In the embodiment of the invention shown, the winch mechanism in the transfer assembly comprises a winch drum 140 and associated haul line 142, the mounting base 144 for the winch drum 140 being attached to the under side of panel 26 of the bumper means B. Rotation of winch drum 140 is accomplished by meshed gear drive and ratchet lock means conventional per se, with winch drive shaft 146 being led out through upright panels 102 to one side of the bumper means B for manual cranking, for example. A haul line anchor post 148 is also provided in the vicinity of the winch drum 140, such as on bottom panel 104, and the vertical panel 100 is also cut away in the central portion thereof to provide an access opening 150 for the haul line when led rearwardly of the assembly.

Figures 3, 4:
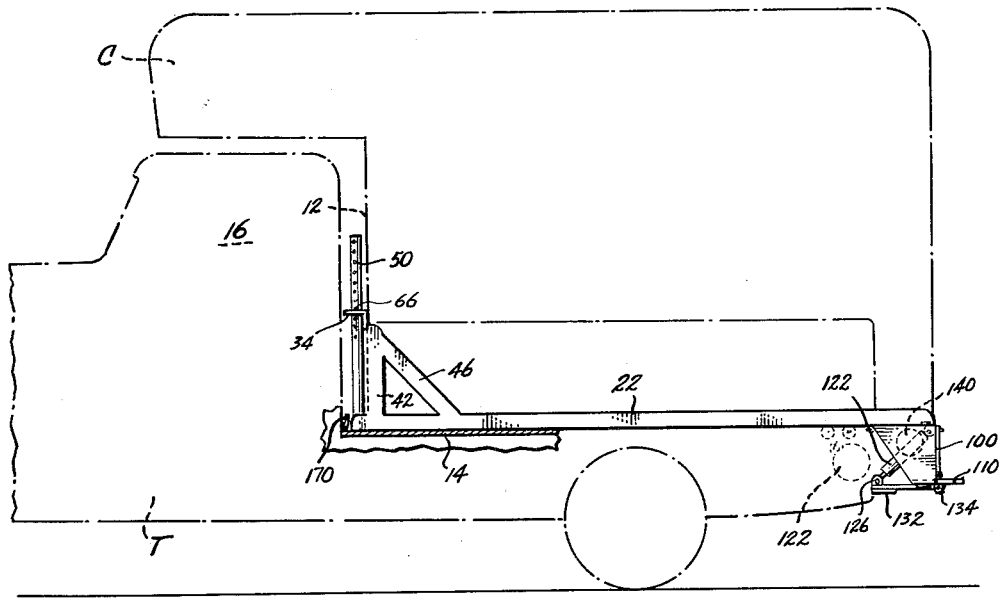
FIG. 3 is a side elevational view of the camper, truck, and camper transfer assembly shown in FIGS. 1 and 2, with the camper and its transfer assembly fully loaded onto the bed of the truck.
FIG. 4 is a side elevational view similar to the showing of FIG. 3, illustrating a position of the camper and its transfer assembly on the truck bed at a point in the unloading operation when the rear end of the camper is partly ground supported and the front end of the camper is still on the truck bed.

The associated winch mechanism installed on the pickup T, as shown somewhat schematically in FIGS. 3-5, comprises a winch drum 152, a haul line 154, a laterally directed drive shaft 156 led out to the side of the pickup T whereby the winch mechanism can be manually cranked, for example. A line access opening 158 is provided in pickup bed 14, through which the haul line 154 passes. Fore and aft placed pulleys 160, 162 are arranged at the sides of access opening 158 to facilitate the movement of haul line 154.

Other typical paraphernalia for the anchoring and handling of the haul lines 142 and 154 incident to the loading and unloading of the camper and its transfer assembly are an anchor pin 164 in the lower central portion of the head frame HF, a pulley 166 in the lower central portion of the head frame HF, a pulley 168 centered in the rear edge of pickup bed 14, and an anchor pin or the like 170 (FIG. 3) in the forward part of the pickup bed 14.

In loading the camper onto the pickup bed 14 from ground supported position with the transfer assembly winch 140, several haul line arrangements are possible, and it will be readily understood that selection of a given haul line arrangement in a particular instance will be largely determined by the type of supporting vehicle presented. For example, haul line 142 can be led forwardly over head frame pulley 166 and truck bed pulley 168 to the anchor pin 170 or other selected anchor point in the forward area of pickup bed 14, and the skid plate 70 is placed in its extended position. Haul line 142 is then taken in until the forward weight of the camper and transfer assembly are supported by the haul line 142 and skid plate 70. At this point, forward legs 48, 50 are retracted by removal and reinsertion of lock pins 64-66, and the camper transfer assembly is further winched onto the pickup bed 14 until approximately in the relative position shown at FIG. 4. Lock pin 88 is then removed and skid plate 70 moved to nested position against head frame HF, after which the haul line 142 is taken in further until the transfer assembly and camper are fully supported by the pickup bed 14. Rear legs 106, 108 are then retracted. In this instance, using an anchor point forward of the bed, such as pin 170, the final stage of movement of the transfer assembly forwardly on the pickup bed 14 should be preceded by an uncoupling of the haul line 142 from its anchor point in order that the haul line will be free for the subsequent loading operation. The camper and transfer assembly can then be slid fully forward manually by engaging the bumper means B with a moving force such as the bumper of another vehicle. Alternatively, the haul line 142 can be provided with a decouplable end section somewhat shorter than the length of bed frame BF to permit decoupling thereof near the winch drum 140 when the camper is nested fully forwardly against the pickup cab 16.

As yet another alternative, the hook-up of the haul line 142 to the pickup T in many instances can be accomplished by anchoring the haul line to the pickup T at the rear thereof. For example, assuming a typical situation where the pickup T has a rear bumper on which or next to which the down tail gate rests, a separate line can be looped around the ends of the bumper to meet at a knotted loop or eye ring at about the center of and just behind the tail gate, and the haul line 142 can be anchored to such loop or eye ring. In this event, the lifting of the front end of the camper and transfer assembly is occasioned solely by skid means, and the loading sequence can proceed as above discussed, after which the haul line 142 can be decoupled from the line looped to the bumper ends, and the latter line can be retained for reuse, as desired.

Loading of the camper and transfer assembly with the pickup winch 152 typically proceeds as follows. Assuming the camper is in ground supported position on the transfer assembly and the pickup T is in place just forwardly of the transfer assembly, haul line 154 is led through access opening 158 and back over pulleys 162, 168 and 166, then around anchor post 148 on the lower panel 104 of bumper means B, then back to anchor pin 164. Skid plate 70 is then locked in extended position, and the on-loading proceeds simply by winching in line 154, with the forward legs 48, 50 being retracted when the camper is in about the position shown at FIG. 5 and the skid plate 70 being retracted when the camper is in about the position shown at FIG. 4.

When the camper and transfer assembly are in fully loaded position, the haul line 154 hook-up indicated above can be left in place to hold the camper on the pickup bed, and is also of use during the subsequent unloading operation. For example, in unloading with this hook-up, the haul line 154 is slacked off slightly and released from anchor post 148 (opening 150 provides convenient access for this release), and the haul line is winched in until taut, the disposition of the line at this stage being with the line leading directly from the anchor pin 164 around pulley 160 onto the winch 152. At this stage of the unloading operation the shock absorber foot plate 132 is manually drawn down to its lowermost position and rear leg means 106, 108 are also extended to approximately the desired height. The camper and its transfer assembly can then be moved off the pickup T by further winching in of the haul line 154. The off-loading movement, diagrammatically designated by arrow 172 (FIG. 4), progresses until the rear end of the transfer assembly is in engagement with the ground and the forward end thereof is still supported by the pickup bed 14, substantially as shown at said FIG. 4. The skid plate 70 is then manually moved from nested to extended position and locked in extended position by placement of lock pin 88. The off-loading of the camper and transfer assembly is then continued by movement of the pickup T forwardly until the forward end of the bed frame BF clears the pickup bed 14 and the weight of the forward end of the camper and transfer assembly is carried by the skid plate 70, substantially as shown at FIG. 5. At this stage of unloading, the forward end of the camper is gradually lowered, and selectively so depending upon the extent of movement of the pickup T, through the action of slope skid surface 90, and the desired support level can be closely approximated.

With the forward weight of the camper thus still supported by the pickup bed 14 contacting the skid surface 90, lock pins 64, 66 are removed from the forward legs 48, 50, dropping the legs to ground contacting position. The lock pins 64, 60 are then reinserted in appropriate adjustment holes 60, 62 to provide the desired forward support level. Pickup T is then moved away from engagement with the skid surface 90, and the camper C is left fully supported on the leg means 48, 50, 106, 108. Haul line 142 is then retrieved, and the skid plates 70 retracted.

Figure 2:
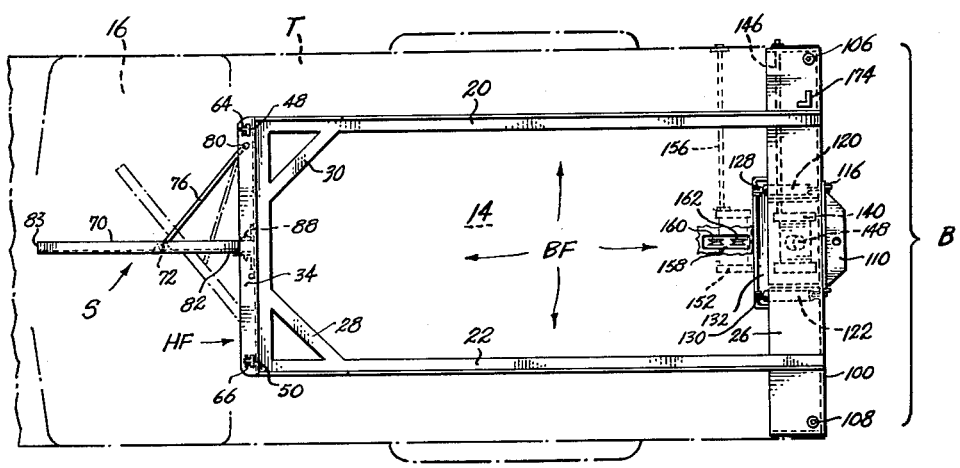
FIG. 2 is a top plan view of the camper transfer assembly shown at FIG. 1, the illustration thereof being in conjunction with a pickup truck as the supporting vehicle, such pickup truck being shown fragmentarily and in phantom.

Precise leveling of the camper C in its ground supported position is effected, as desired, by individual further adjustment of the various leg means 48, 50, 106, 108. To facilitate final leveling, a two-way spirit level is provided at a suitable location, such as on the horizontal panel 26 of bumper means B, as indicated at 174 (FIGS. 2 and 6).

In unloading with the transfer assembly winch 140, the operation can proceed essentially as described above except that the initial off-loading of the transfer assembly and camper is accomplished by the transfer winch haul line 142 being led out access opening 150 to a suitable anchor point rearwardly of the camper, such as a tree or stake. The camper and its transfer assembly can then be moved off the pickup T, either by winching in the haul line 142 by cranking shaft 146, or by simply slowly driving the pickup T out from under the transfer assembly. The off-loading movement then progresses in the sequence above discussed, with the skid means extended when the transfer assembly and camper are in about the position shown at FIG. 4, and with the forward legs extended and preliminarily set when the camper and transfer assembly are in about the position shown in FIG. 5.

FIG. 7 illustrates a modified form of skid means S'. In this form of skid means the configurations of the bed frame BF and head frame HF' are as discussed above, and the skid means S' comprises a pair of skid plates 180, 182, respectively mounted for pivotal movement with respect to the head frame HF, such as by means of upper and lower pairs of pins, the respective upper pins 184, 186 being journaled in the upper iron 34' of the head frame HF' and the lower pairs of pins being journaled in forwardly directed lugs 188, 190 standing out from the lower iron 32' of head frame HF'. To brace the extended skid plates 180, 182, respective lock plates 192, 194 are hinged to the skid plates 180, 182. Said lock plates 192, 194 fold out horizontally when the skid plates 180, 182 are extended and are lockable in bracing position by means of removable lock pins 196, 198. When the plates 180, 192 and 182, 194 are nested against the head frame HF', the lock pins 196, 198 also serve to lock said plates in their nested position.

The skid plates 180, 182 and the respective skid surfaces 200, 202 function in like manner to the skid plate 70 and its skid surface 90, and conjunctively afford an enhanced degree of lateral stability forwardly during an unloading or loading operation, in that two laterally spaced skid surfaces are provided forwardly rather than one. However, for most purposes, it has been found that a single skid surface is quite adequate, and it is considered that whether one or more skid surfaces are employed forwardly is largely a matter of design choice.

As will also be evident with respect to the skid means arrangements S and S', the various skid surfaces 90, 200 and 202 can be configured to present a straight incline or such other desired sloped configuration as may be deemed appropriate. However, the concavely curved configuration shown is considered preferable, in that somewhat lesser criticality is provided in arriving at desired support height for the forward end of the assembly during unloading (again note FIG. 5).

Further variation in transfer assembly component details and arrangements will be apparent to those skilled in the art. Thus, by way of illustrative and non-limitive further examples, while the embodiments shown involve angle-iron T-iron and flat bar and plate stock in their fabrication, it will be readily understood that other forms of stock can be employed, such as I-iron, channel iron and/ or tube, for example. Likewise, the retractable corner supports can be of other forms than disclosed above, such as by incorporating skid type footing if desired. Similarly, the winches involved can be power driven as by electric motors if desired, the skid means can be arranged to be simply detachable or to extend and retract by sliding rectilinearly at the sides of the camper rather than by folding. Similarly also, roller means can be installed at the rear edge of the pickup bed 14 to facilitate unloading and loading movement of the bed frame.

While the transfer assembly disclosed has been designed expressly for use in conjunction with campers as now marketed, it will be understood that the transfer assembly framing can be built into the camper as new construction, with built-in extensible ground supports, so that the only externally discernible features of the transfer assembly are the ground supports and the forwardly extendible skid means.

As previously indicated, and as will readily be understood, transfer assemblies characteristic of the invention can be utilized for loading, unloading and ground supporting disengageable framed units other than campers, such as detachable cargo racks, detachable van bodies, detachable live stock carriers, and the like.

From the foregoing, various further modifications, adaptations and applications of the present invention will be apparent to those skilled in the arts to which the invention is addressed, within the scope of the following claims.

What I claimed is:

1. In combination, a supporting vehicle of the type having a behind-cab open bed, a framed unit carried by and disengageable from said vehicle bed, and a unit transfer assembly for use in conjunction with said framed unit to aid in loading and unloading the framed unit from the supporting vehicle and to serve as ground engaging support for the framed unit when the unit is off the vehicle, such unit transfer mechanism comprising:

(a) a bed frame substantially coextensive with and supportably engageable with the base of said framed unit;

(b) ground support means situated substantially at the corners of said bed frame, including mechanism by which such support means are vertically adjustable and lockable in position with respect to said bed frame; and (c) skid means extensible forwardly of and in supporting relation to said bed frame, the said skid means having a sloped lower surface running forwardly and upwardly from about the lower forward edge of said bed frame when the skid means is in extended position with respect to said bed frame, said skid means being retractable into a position substantially coextensive with the forward portion of and entirely above the lower forward edge of said bed frame.

2. The combination of claim 1, wherein the sloped portion of said skid means is of curved configuration.

3. The combination of claim 2, wherein the sloped portion of said skid means is of concavely curved configuration.

4. The combination of claim 1, comprising a single skid means extendable forwardly from substantially the lateral center of said bed frame.

5. The combination of claim 1, comprising a plurality of skid means extendable forwardly in a laterally spaced manner.

6. The combination of claim 1, wherein said skid means comprises two forwardly extendable skid plates, each pivotally mounted to be extendable forwardly in laterally spaced, substantially parallel disposition.

7. A unit transfer assembly for use in conjunction with a framed unit carried by and disengageable from the bed of a supporting vehicle to aid in loading and unloading the framed unit from the supporting vehicle and to serve as ground engaging support for the framed unit when the unit is off the vehicle, such unit transfer mechanism comprising:

(a) a bed frame supportedly engaging the base of said camper;

(b) a head frame substantially engaging the leading wall of said camper;

(c) vertically adjustable leg means at the sides of and extensible downwardly from said head frame; and (d) forwardly directable skid means providing a downwardly facing, sloping surface with an upward incline leading forward of the lower part of said head frame, the said skid means being arranged in frame supporting relation to said head frame and bed frame when forwardly directed thereof and being pivotally foldable laterally with respect to said framed unit so as to nest substantially thereagainst when said framed unit and its transfer assembly are loaded fully forwardly on the bed of the supporting vehicle.

8. The combination of claim 7, further comprising a laterally extending bumper means in part serving as the rear part of the said bed frame, the vertically adjustable leg means associated with the rear corners of said bed frame being placed near the ends of said bumper means.

9. The combination of claim 7, further comprising shock absorber means extendable below the rear part of said bed frame to cushion impact of the camper support structure and rear of the camper with the ground during unloading thereof from the supporting vehicle.

10. The combination of claim 7, comprising a box-like structure extending laterally of said unit transfer assembly at the rear thereof, a portion of said box-like structure serving as a rear part of said bed frame, and a downwardly directed portion of said structure serving as a tail frame and bumper means.

11. The combination of claim 10, further comprising winch means including a winch drum journaled in the central area of said box-like structure, and a haul line wove around said winch drum, by means of which the framed unit and unit transfer assembly can be winched on to and off of the supporting vehicle.

12. The combination of claim 11, wherein said box-like structure comprises a substantially horizontal wall in the portion thereof serving as part of said bed frame, and a substantially vertical wall in the portion thereof serving as the tail frame and bumper means, said combination further comprising trailer hitch mounting means standing rearwardly of said substantially vertical wall portion.

13. The combination of claim 11, wherein said tail frame and bumper means further comprises step means hinged along substantially the lower edge of said vertical wall portion, so as to be movable from a substantially vertical position nested against said wall portion to a substantially horizontal position.

14. The combination of claim 11, further comprising an opening in said vertical wall portion immediately rearward of the said winch drum, by means of which the haul line can be led from the winch drum to an anchor point rearward of the assembly when unloading the framed unit from the supporting vehicle.

15. In combination with a vehicle equipped with an open bed, a framed unit adapted to be carried on the bed of the vehicle and to be off-loaded from the vehicle and supported on self-contained support means, and a framed unit transfer means aiding in loading and unloading the framed unit from the bed of the vehicle, said transfer means comprising skid means extensible forwardly of the framed unit and configured to present inclined lower surface means engageable with the rear edge of said vehicle bed to gradually lift the front end of said framed unit in the progress of the framed unit from a ground supported position to a fully loaded position on the bed of the vehicle, means movably mounting said skid means on said framed unit in a manner enabling movement thereof into a retracted position substantially coextensive with the forward portion of and entirely above the lower forward edge of said framed unit, such combination further comprising a winch assembly and hauling line arranged to act between said vehicle and said transfer means for the loading of the framed unit on the bed of the vehicle.

16. The combination of claim 15, wherein said winch assembly is situated on the vehicle below the rear portion of the bed thereof.

17. The combination of claim 15, wherein said winch assembly is situated on said transfer means in the rear portion thereof.

18. In combination with a supporting vehicle and a framed unit carried by and disengageable from the bed of the supporting vehicle; unit transfer mechanism serving to aid in loading and unloading same from said supporting vehicle and serving as ground contacting support therefor when the framed unit is off the vehicle, such unit transfer mechanism comprising:
  (a) a bed frame substantially coextensive with and supportably engaging the base of said framed unit;
  (b) ground support means situated substantially at the corners of said bed frame, including mechanism by which such support means are vertically adjustable and lockable in position with respect to said bed frame; and
  (c) skid means retractable into a storage position generally coextensive with the forward portion of the framed unit and entirely above said bed frame, said skid means being extensible forwardly of and in supporting relation to said bed frame, with a sloped lower surface running forwardly and upwardly from about the lower forward edge of said bed frame when the skid means is in extended position with respect to said bed frame.

19. In combination with a supporting vehicle and a framed unit carried by and disengageable from the bed of the supporting vehicle, unit transfer mechanism to aid in loading and unloading the framed unit from the supporting vehicle and to serve as ground engaging support for the framed unit when the unit is off the vehicle, such unit transfer mechanism comprising:
  (a) a bed frame substantially coextensive with and supportably engaging the base of said framed unit;
  (b) ground support means situated substantially at the corners of said bed frame, including mechanism by which said support means are vertically adjustable and lockable in position with respect to said bed frame;
  (c) skid means extensible forwardly of and in supporting relation to said bed frame, the said skid means having a sloped lower surface running forward and upwardly from about the forward edge of said bed frame when the skid means is in extended position with respect to said bed frame; and
  (d) means for pivotally folding said skid means with respect to the forward part of said bed frame so as to nest substantially against the framed unit and entirely above the lower forward edge of said bed frame when said framed unit and its transfer assembly are loaded fully forwardly on the bed of the supporting vehicle.

20. In combination with a supporting vehicle of the type having a behind-cab open bed, a framed unit carried by and disengageable from the said vehicle bed, and unit transfer mechanism aiding in loading and unloading the framed unit from the vehicle and serving as ground contacting support therefor when the frame unit is off the vehicle, such transfer mechanism comprising:
  (a) a bed frame supportably engaging the base of said camper;
  (b) a head frame substantially engaging the leading wall of said camper;
  (c) vertically adjustable leg means at the sides of and extensible downwardly from said head frame; and
  (d) forwardly directable skid means providing a downwardly facing, sloping surface with an upward incline leading forward of the lower part of said head frame, the said skid means being movable between a forwardly extending framed unit supporting position and a retracted, storage position generally coextensive with said head frame and entirely above the said bed frame, and said skid means being arranged in frame supporting relation to said head frame and bed frame when forwardly directed thereof.

21. The combination of a supporting vehicle, a camper, and a camper transfer and support assembly, such assembly comprising:
  (a) a bed frame supportably engaging the base of said camper;
  (b) a head frame in rigid relation to and standing uprightly from the leading edge of said bed frame;
  (c) vertically adjustable leg means associated with said bed frame;
  (d) vertically adjustable leg means associated with the rear corners of said bed frame; and
  (e) skid means mounted in laterally foldable, forwardly directable relation to said head frame, the configuration of said skid means presenting an inclined surface sloped forwardly and upwardly from about the leading edge of said bed frame, so that forward movement of the camper supporting assembly onto the bed of the supporting vehicle occasions support of the forward end of the camper and camper transfer assembly on the bed of the supporting vehicle by contact of said skid means with the rearward edge of said supporting vehicle bed.

22. In combination with a vehicle of the type having a behind-cab open bed, a framed unit adapted to be carried on the bed of the vehicle and to off-loaded from the vehicle, and supporting skid means for aiding in the loading and unloading of said vehicle from the bed of the supporting unit, means movably mounting said supporting skid means on said framed unit so that when in use for support the skid means extend forwardly from the framed unit and present forwardly inclined lower surface means engageable with the rear edge of said vehicle bed and so that when not in use for support said skid means are movable to a position substantially coextensive with and entirely above the lower forward edge of the framed unit, such combination further comprising a winch assembly and hauling line arranged to act between said vehicle and said framed unit for the loading of the framed unit on the bed of the vehicle.

23. A framed unit adapted to be carried on the bed of a vehicle and to be off-loaded from the vehicle, and skid means for aiding in the loading and unloading of said framed unit from the bed of the supporting vehicle, said skid means when in use extending forwardly from the framed unit and presenting forwardly inclined surface means engageable with the rear edge of said vehicle bed, and means mounting said skid means for lateral pivotal movement relative to the framed unit, said skid means being movable between the forwardly extending in use position and a retracted position substantially coextensive with the forward portion of the framed end for storage when not in use.

References Cited by the Examiner
UNITED STATES PATENTS

| | | | |
|---|---|---|---|
| 1,030,320 | 6/12 | Morgan | 214—38.44 |
| 1,269,265 | 9/17 | Duggan | 214—515 |
| 1,839,875 | 1/32 | Gower | 248—350 |
| 1,933,211 | 10/33 | Flowers. | |
| 2,021,952 | 11/35 | Wren | 214—517 |
| 2,462,907 | 3/46 | Savage | 214—392 |
| 2,665,020 | 1/54 | Whittle | 214—517 |
| 2,665,938 | 1/54 | McCrossen | 214—515 |
| 2,754,080 | 7/56 | Steinbach | 248—350 |
| 2,867,339 | 1/59 | Nelson | 214—517 |
| 2,958,432 | 11/60 | Milhem | 214—84 |

FOREIGN PATENTS 88,258   9/56   Norway.

HUGO O. SCHULZ, *Primary Examiner.*
GERALD M. FORLENZA, *Examiner.*